United States Patent [19]

Gerresheim

[11] Patent Number: 5,700,336
[45] Date of Patent: Dec. 23, 1997

[54] BEAD CORE FOR A PNEUMATIC TIRE

[75] Inventor: Manfred Gerresheim, Obertshausen, Germany

[73] Assignee: SP Reifenwerke GmbH, Hanau, Germany

[21] Appl. No.: 561,025

[22] Filed: Nov. 21, 1995

[30] Foreign Application Priority Data

Nov. 25, 1994 [DE] Germany .......... 44 42 068.4

[51] Int. Cl.$^6$ .......... B60C 15/04; B60C 15/05
[52] U.S. Cl. .......... 152/540; 152/539; 152/545; 245/1.5
[58] Field of Search .......... 152/540, 545, 152/539; 245/1.5; 156/136

[56] References Cited

U.S. PATENT DOCUMENTS

| | | | |
|---|---|---|---|
| 3,942,574 | 3/1976 | Bantz | 152/540 |
| 4,376,458 | 3/1983 | Lejeune | 152/540 |
| 4,557,307 | 12/1985 | Philpott | 156/136 X |
| 5,307,853 | 5/1994 | Okuda | 152/540 |

FOREIGN PATENT DOCUMENTS

| | | | |
|---|---|---|---|
| 0620130 | 4/1994 | European Pat. Off. . | |
| 3631736 | 3/1988 | Germany . | |
| 4137726 | 5/1992 | Germany . | |
| 4278811 | 10/1992 | Japan | 245/1.5 |
| 516620 | 1/1993 | Japan | 152/545 |
| 616019 | 1/1994 | Japan | 245/1.5 |
| 672109 | 3/1994 | Japan | 245/1.5 |
| 6171323 | 6/1994 | Japan | 245/1.5 |
| 2123360 | 2/1984 | United Kingdom . | |

OTHER PUBLICATIONS

Patent Abstracts of Japan, vol. 18, No. 220, (M-1595 & JP-A-60-16019).

*Primary Examiner*—Adrienne C. Johnstone
*Attorney, Agent, or Firm*—Birch, Stewart, Kolasch & Birch, LLP.

[57] ABSTRACT

A bead core for a pneumatic tire is built up from a ring element and a load carrying element wound into the ring element, wherein the load carrying winding is subdivided by a support wall of the ring element into two regions. The boundary walls at the edge regions of the ring element preferably have a radial extent less than that of the support wall.

13 Claims, 1 Drawing Sheet

BEAD CORE FOR A PNEUMATIC TIRE

In the general endeavor to manufacture motor vehicles which are increasingly lighter in weight, it is also a requirement with respect to the vehicle tires to achieve weight savings on the tires. A not inconsiderable proportion of the tire weight is attributed to the bead cores. These customarily consist of a winding of steel cords which have a high modulus of elasticity so that essentially non-extensible bead rings are formed.

BACKGROUND OF THE INVENTION

Tires are known in which the bead cores or bead rings consist of textile cords which are lighter in weight in comparison to steel cords and of a sleeve which partially surrounds such textile cord winding. The sleeve which is approximately U-shaped in cross-section holds the textile cord winding together and forms the shape into which the respective textile cord is wound during the winding process.

SUMMARY OF THE INVENTION

It is the object of the invention to provide a stable bead core which can be manufactured in a particularly economical manner.

According to the present invention a bead core for a pneumatic tire comprises a ring element and a reinforcement element wound onto the ring element to provide a load carrying winding, wherein the load carrying winding is subdivided into two regions by a support wall on the ring element.

The support wall imparts the stability of the ring element, and thus of the overall bead core, in an advantageous manner.

The boundary walls at the edge regions of the ring element may have a radial extent less than that of the support wall. Thus in the case of two regions these are more easily accessible so that the winding of the two load carrying element regions is simplified.

Another aspect of the invention provides a method of winding a bead core for a pneumatic tire, in particular a bead core wherein two regions of the load carrying winding on the ring element are simultaneously wound in their respective regions of the ring element separated from one another by a support wall of the ring element.

Preferably the load carrying elements are supplied from two separate winding units.

BRIEF DESCRIPTION OF THE DRAWINGS

Further aspects of the invention are apparent from the following description by way of example only of embodiments in conjunction with the attached Figures in which.

DETAILED DESCRIPTION OF THE INVENTION

Figure 1:
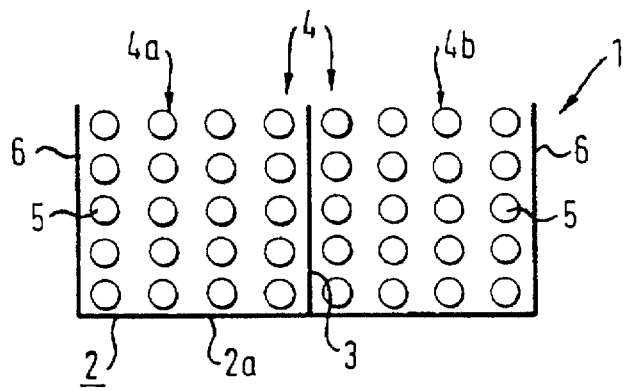
FIGS. 1–4 show respective schematic cross-sectional views of different bead cores formed in accordance with the present invention.

FIG. 1 shows a cross-section through a bead core 1 in which a ring element 2 has a base 2a which extends parallel to the axis of a non-illustrated pneumatic tire. A central support wall 3 is arranged on the base 2a at the center of its axial extent and preferably extends around the entire circumference of the ring element 2 and radially outwardly substantially perpendicular to the base 2a of the ring element 2.

The support wall 3 subdivides a load carrying winding 4 wound onto the ring element 2 into two regions 4a,4b of substantially the same size. The winding 4 comprises load carrying reinforcement elements 5 comprising textile cords, in particular Kevlar (Registered Trade Mark) (aromatic polyamide) cords.

A respective boundary wall 6 is provided at each of the two axially outwardly disposed marginal regions of the ring element base 2a. The boundary walls 6 extend radially outwardly and essentially parallel to the support wall 3 and have a radial extent corresponding to that of the support wall 3. In this manner two regions of the ring element 2 arise as a result of the boundary walls 6 and the support wall 3. The two regions respectively surround a region 4a,4b of the load carrying element winding 4, at least partially, and thus increase the stability of the bead core prior to its incorporation into the tire.

Both regions 4a,4b of the load carrying element winding 4 are preferably formed as a mono-winding, that is to say they respectively consist of a single load carrying element 5 wound onto the ring element 2. Both regions 4a,4b are preferably wound in an identical manner onto the respective region of the ring element 2.

The ring element 2 preferably consists of a material of low weight, in particular-of plastic, which has an inherent stability which should be as high as possible.

Figure 2:
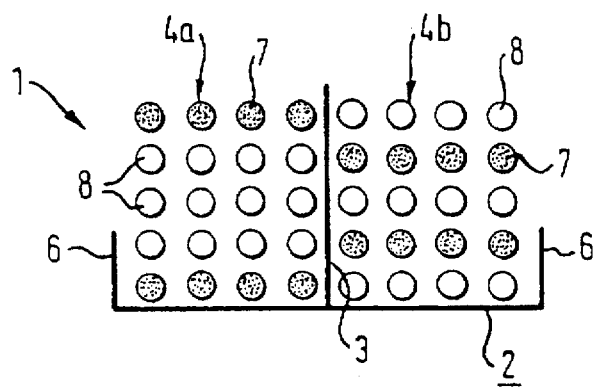

In the cross-section shown in FIG. 2 the boundary walls 6 of the ring element 2 are of lesser radial extent than the support wall 3. They still extend parallel to the latter. The accessibility of the two regions of the ring element 2 for winding is improved as a result of the lower boundary walls 6, so that the winding of the two regions 4a,4b is made easier. The height of the boundary walls is however so dimensioned that an adequate retention of the winding regions 4a,4b is ensured and the windings cannot slide away outwardly in the axial direction.

As shown in FIG. 2, the wound regions 4a,4b can consist of load carrying elements of different aterials and combinations of steel cord 7 and of aramide cords 8 are preferably used. In FIG. 2 a load carrying element arrangement is for example shown in the region 4a, to the left of the support wall 3, in which both the innermost and also the outermost radial layers consist of steel cords 7 and, the intermediate layers are formed of aramide cords 8. In the region 4b to the right of the support wall 3, the steel cord layers and the aramide cord layers are in contrast alternately arranged in the radial direction. The strength of such steel-aramide combinations is very high and leads to a considerable weight reduction when compared with customer bead cores with a load carrying element winding consisting solely of steel.

The different load carrying element combinations shown in FIG. 2 on both sides of the support wall 3 serve solely for explanation. As a rule, both regions 4a,4b of the load carrying winding 4 are built up identically. Apart from the steel-aramide combinations shown, a pure "non-steel" winding is also possible with the bead core shown in FIG. 2.

Figure 3:
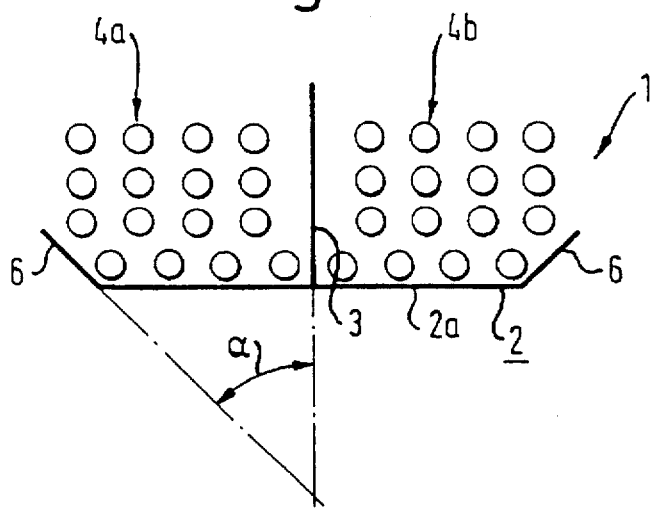

FIG. 3 shows a further embodiment of a bead core 1 in accordance with the invention in which the boundary walls have a lesser radial extent than the support wall 3, as in the embodiment shown in FIG. 2. In addition, the boundary walls 6 are however here inclined outwardly in the axial direction, so that they both extend at an angle α between 0° and 90° exclusive to the support wall 3. The radial extent of the boundary walls 6 which are axially outwardly inclined in accordance with FIG. 3 is less than that of FIG. 2 so that, for the carrying out of the winding process, the access to the two regions of the ring element 2 is further simplified. At the same time, however, an advantageous reception is provided for the load carrying windings 4a,4b which prevents them sliding away axially towards the outside. The transition between the base 2a of the ring element 2 which extends in the axial direction and the boundary walls 6 can adopt any desired shape and can, for example, be formed by a curved section.

Figure 4:
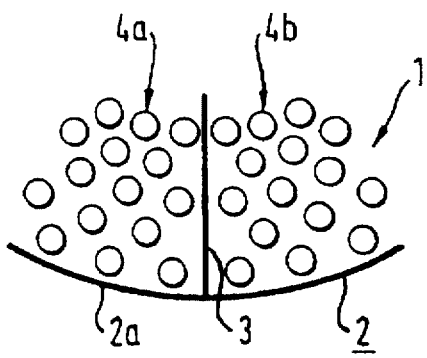

FIG. 4 shows a cross-section through a further bead core 1 in accordance with the invention in which the base 2a of the ring element 2 is curved and outwardly concavely formed, whereby a radially inwardly arched reception region is provided which counteracts any sliding away of the winding regions 4a,4b particularly well.

The base 2a in this embodiment is preferably curved in circular arc-like manner, with the radius of the circular arc being matched to the respectively required axial and radial dimensions of the bead core 1.

In all bead cores 1 formed in accordance with the present invention, the regions 4a,4b of the load carrying winding 4 can be built up of load carrying elements 5 of a single material or of material combinations, for example as described in the embodiment shown in FIG. 2. Both regions 4a,4b are also preferably executed as single- or mono-windings.

As both regions 4a,4b of the bead core of the invention are completely separated from one another by the support wall 3 of the ring element 2, the two regions of the load carrying winding can be simultaneously wound onto the ring element for the manufacture of the bead core, so that the time required to manufacture the full load carrying winding 4 can be reduced approximately t one half, since a separate load carrying winding which is only half as large as that of a corresponding customary bead core is simultaneously produced on both sides of the support wall 3 in each case.

The boundary walls 6 of the ring element 2 which are preferably made lower than the support wall 3 in accordance with FIG. 3 and inclined axially outwardly facilitate in advantageous manner the access to the two regions of the ring element 2, so that the winding device used to manufacture the load carrying element winding 4 can be brought up to the ring element 2 in the axial direction and a simplified winding from the side is possible for the simultaneous manufacture of the two regions 4a,4b of the load carrying winding 4.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

Having now described my invention what I claim is:

1. A bead core for a pneumatic tire, the bead core comprising a ring element and a reinforcement element wound onto the ring element to provide a load carrying winding, wherein the ring element includes a base and a stabilizing support wall extending substantially radially outwardly from the base to subdivide the load carrying winding into only two regions, wherein the base of the ring element has boundary walls at its axially outer regions, said boundary walls extending radially outwardly from the base and inclining axially outwardly so that each forms an included angle α between 0° and 90° exclusive with the support wall.

2. The bead core in accordance with claim 1, wherein the support wall extends over the entire circumference of the base of the ring element.

3. The bead core in accordance with claim 1, wherein the support wall is centrally arranged in the axial direction on the base of the ring element, so that the load carrying winding is subdivided into two regions of substantially the same size.

4. The bead core in accordance with claim 1, wherein the radial extent of the boundary walls is less than that of the support wall.

5. A bead core in accordance with claim 1, wherein the ring element has a radially inwardly arched, curved cross-section.

6. The bead core in accordance with claim 1, wherein the ring element consists of a material of low weight.

7. The bead core in accordance with claim 6, wherein the ring element material is plastic having a high inherent stability.

8. The bead core in accordance with claim 1, wherein both regions of the load carrying winding are formed as a mono-winding.

9. The bead core in accordance with claim 1, wherein the load carrying winding is formed of textile cords.

10. The bead cord in accordance with claim 9, wherein the textile cords are aramid cords.

11. The bead core in accordance with claim 1, wherein the load carrying winding is formed of cords of different materials.

12. The bead core in accordance with claim 11, wherein the cords of different materials are steel cords and aramid cords.

13. The bead core in accordance with claim 1, wherein both regions of the load carrying winding on the ring element are identically wound so that the bead core is symmetrical with respect to the support wall of the ring element.

* * * * *